(12) United States Patent
Jones et al.

(10) Patent No.: US 9,400,900 B2
(45) Date of Patent: Jul. 26, 2016

(54) METHOD AND APPARATUS PERTAINING TO RFID TAG-BASED USER ASSERTIONS

(71) Applicant: Wal-Mart Stores, Inc., Bentonville, AR (US)

(72) Inventors: Nicholaus A. Jones, Fayetteville, AR (US); Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 478 days.

(21) Appl. No.: 13/804,393

(22) Filed: Mar. 14, 2013

(65) Prior Publication Data

US 2014/0266632 A1 Sep. 18, 2014

(51) Int. Cl.
*H04Q 5/22* (2006.01)
*G06K 7/10* (2006.01)
*G06Q 10/08* (2012.01)
*G06K 19/07* (2006.01)

(52) U.S. Cl.
CPC ............ *G06K 7/10009* (2013.01); *G06Q 10/08* (2013.01); *G06K 19/0712* (2013.01); *G06K 19/0723* (2013.01)

(58) Field of Classification Search
CPC .................................................. G06K 7/10009
See application file for complete search history.

(56) References Cited

U.S. PATENT DOCUMENTS

| | | |
|---|---|---|
| 5,376,778 A | 12/1994 | Kreft |
| 6,641,036 B1 | 11/2003 | Kalinowski |
| 6,894,660 B2 | 5/2005 | Sanogo |
| 6,946,951 B2 | 9/2005 | Cole |
| 6,992,567 B2 | 1/2006 | Cole |
| 7,170,415 B2 | 1/2007 | Forster |
| 7,187,267 B2 | 3/2007 | Cole |
| 7,187,288 B2 | 3/2007 | Mendolia |
| 7,205,896 B2 | 4/2007 | Wu |

(Continued)

FOREIGN PATENT DOCUMENTS

| | | |
|---|---|---|
| CN | 101021894 | 8/2007 |
| CN | 101076644 | 11/2007 |

(Continued)

OTHER PUBLICATIONS

U.S. Appl. No. 13/870,647, filed Apr. 25, 2013, Jones.

(Continued)

*Primary Examiner* — Omeed Alizada
(74) *Attorney, Agent, or Firm* — Fitch Even Tabin & Flannery LLP

(57) ABSTRACT

An apparatus includes a display and one or more user-assertable surfaces. When asserted by a user, such a surface selectively couples a corresponding near-field RFID tag to a far-field component such that information stored by the near-field RFID tag is transmitted via the far-field component. The display, in turn, presents at least some information that the apparatus receives via an RFID transceiver. Depending upon the design this RFID transceiver can be the same as the aforementioned near-field RFID tag or can comprise a different RFID tag (such as but not limited to a far-field RFID tag). By one approach the aforementioned user-assertable surfaces comprise discrete push buttons. When the far-field component comprises a far-field antenna, asserting such a push button can serve to place the corresponding near-field RFID tag into operable proximity to the far-field antenna.

13 Claims, 3 Drawing Sheets

(56) References Cited

U.S. PATENT DOCUMENTS

| | | |
|---|---|---|
| 7,221,259 B2 | 5/2007 | Cole |
| 7,432,817 B2 | 10/2008 | Phipps |
| 7,528,726 B2 | 5/2009 | Lee |
| 7,633,394 B2 | 12/2009 | Forster |
| 7,642,916 B2 | 1/2010 | Phipps |
| 7,642,917 B2 | 1/2010 | Tran |
| 7,762,472 B2 | 7/2010 | Kato |
| 7,800,497 B2 | 9/2010 | Marusak |
| 7,812,729 B2 | 10/2010 | Copeland |
| 7,823,269 B2 | 11/2010 | Martin |
| 7,880,620 B2 | 2/2011 | Hatori |
| 7,973,662 B2 | 7/2011 | Phipps |
| 8,063,779 B2 | 11/2011 | Coveley |
| 8,258,958 B2 | 9/2012 | Kang |
| 8,286,884 B2 | 10/2012 | Wilkinson |
| 8,286,887 B2 | 10/2012 | Wilkinson |
| 8,410,937 B2 | 4/2013 | Collins |
| 8,505,829 B2 | 8/2013 | Wilkinson |
| 8,544,758 B2 | 10/2013 | Wilkinson |
| 8,669,915 B2 | 3/2014 | Wilkinson |
| 8,857,724 B2 | 10/2014 | Wilkinson |
| 8,857,725 B2 | 10/2014 | Wilkinson |
| 2003/0025636 A1 | 2/2003 | Chen |
| 2004/0046643 A1 | 3/2004 | Becker |
| 2006/0065709 A1* | 3/2006 | Yamashita ............ 235/375 |
| 2006/0145710 A1 | 7/2006 | Puleston |
| 2006/0158311 A1 | 7/2006 | Hall |
| 2007/0096915 A1 | 5/2007 | Forster |
| 2007/0164868 A1 | 7/2007 | Deavours |
| 2007/0224939 A1* | 9/2007 | Jung et al. ............ 455/41.2 |
| 2007/0286764 A1* | 12/2007 | Noguchi et al. ............ 422/3 |
| 2007/0290856 A1 | 12/2007 | Martin |
| 2008/0018431 A1 | 1/2008 | Turner |
| 2008/0048834 A1 | 2/2008 | Lenevez |
| 2008/0088459 A1 | 4/2008 | Martin |
| 2008/0094181 A1 | 4/2008 | Lenevez |
| 2008/0116256 A1 | 5/2008 | Martin |
| 2008/0129512 A1 | 6/2008 | Bielas |
| 2008/0129513 A1 | 6/2008 | Bielas |
| 2009/0008460 A1 | 1/2009 | Kato |
| 2009/0015480 A1 | 1/2009 | Shafer |
| 2009/0027208 A1 | 1/2009 | Martin |
| 2009/0066516 A1 | 3/2009 | Lazo |
| 2009/0108993 A1 | 4/2009 | Forster |
| 2009/0206995 A1 | 8/2009 | Forster |
| 2010/0001079 A1 | 1/2010 | Martin |
| 2010/0045025 A1 | 2/2010 | Cote |
| 2010/0060425 A1 | 3/2010 | Rodriguez |
| 2010/0079245 A1 | 4/2010 | Perng |
| 2010/0079287 A1 | 4/2010 | Forster |
| 2010/0230500 A1* | 9/2010 | Wilkinson ............ 235/492 |
| 2010/0277320 A1* | 11/2010 | Gold ............ 340/572.1 |
| 2011/0012713 A1 | 1/2011 | Wilkinson |
| 2011/0063113 A1 | 3/2011 | Hook |
| 2011/0298591 A1 | 12/2011 | Mickle |
| 2012/0013440 A1 | 1/2012 | vonBose |
| 2012/0013441 A1 | 1/2012 | Ulrich |
| 2012/0086553 A1 | 4/2012 | Wilkinson |
| 2012/0155349 A1 | 6/2012 | Bajic |
| 2012/0217307 A1 | 8/2012 | Martin |
| 2012/0274449 A1 | 11/2012 | Wilkinson |
| 2013/0040570 A1 | 2/2013 | Wilkinson |
| 2013/0043308 A1 | 2/2013 | Wilkinson |
| 2013/0206846 A1 | 8/2013 | Wilkinson |
| 2013/0299583 A1 | 11/2013 | Wilkinson |
| 2014/0320265 A1 | 10/2014 | Jones |

FOREIGN PATENT DOCUMENTS

| | | |
|---|---|---|
| GB | 2481156 | 12/2011 |
| JP | 2004046904 A | 2/2004 |
| JP | 2008158569 A | 7/2008 |
| JP | 2008162120 | 7/2008 |
| JP | 2009049763 | 3/2009 |
| KR | 200412323 Y1 | 3/2006 |
| KR | 20070026388 A | 3/2007 |
| WO | 2005073937 A2 | 8/2005 |
| WO | 2009018271 A1 | 2/2009 |
| WO | 2010104991 A2 | 9/2010 |

OTHER PUBLICATIONS

U.S. Appl. No. 13/871,572, filed Apr. 26, 2013, Jones.
EPCglobal; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.
Nikitin et al.; An Overview of Near Field UHF RFID; Feb. 2007; 8 pages; IEEE.
RFIDSOUP.com; RFID Soup; Mar. 6, 2009; 12 pages; published at http://rfidsoup.pbwiki.com.
Swedberg, Claire; RFID Puts Salt Lake City Drivers in the Fast Lane; RFID Journal; Oct. 1, 2010; 5 pages; published at http://www.rfidjournal.com/article/view/7907.
tagsense.com, TagSene Frequently Asked Questions; Mar. 6, 2009; 3 pages; published at www.tagsense.com/ingles/faq/faq.html.
Tagsys; AK Product Datasheet; Dec. 19, 2012; 1 page; published at www.tagsysrfid.com/products-services/rfid-tags/ak.
Tagsys; AK Product Datasheet; Feb. 14, 2010; 1 page; published at webarchive.org/web/20100214004043/http://www.tagsysrfid.com/products-services/rfid-tags/ak.
Tagsys; AK5 Converted Product Specification; Oct. 2012; 2 pages; published at www.tagsysrfid.com.
Tagsys; AKTag UHF Tag Datasheet; Nov. 23, 2012; 2 pages; published at www.tagsysrfid.com.
Tagsys; UHF AK Tag; Sep. 2008; 2 pages; published at www.tagsysrfid.com.
technovelgy.com; Passive RFID Tag (or Passive Tag); Mar. 5, 2009; 5 pages; published at www.technovelgy.com.
Wikipedia; RFID; Mar. 6, 2009; 2 pages; published at http://rfidsoup.pbwiki.com.

* cited by examiner

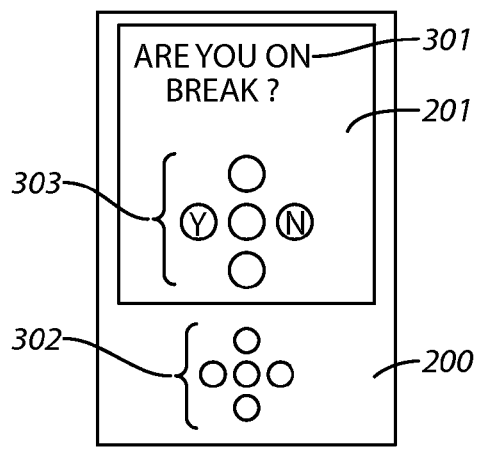
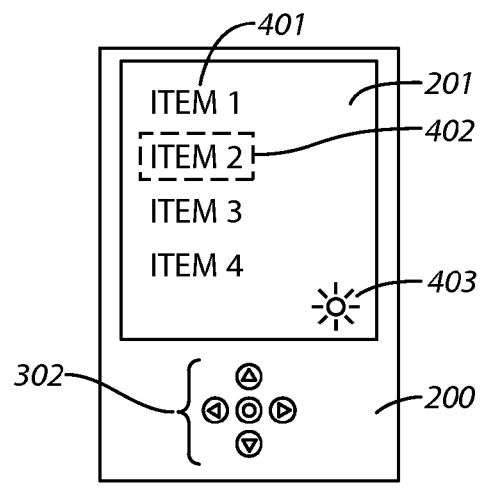
*FIG. 3*  *FIG. 4*
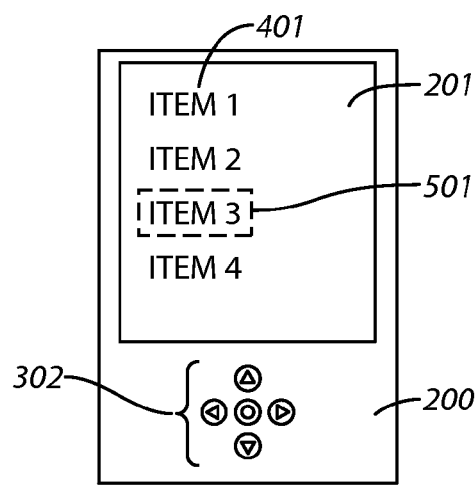
*FIG. 5*

METHOD AND APPARATUS PERTAINING TO RFID TAG-BASED USER ASSERTIONS

TECHNICAL FIELD

This invention relates generally to radio-frequency identification (RFID)-tag reader systems.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

In some cases a system designer will seek to provide more-or-less ubiquitous coverage through a given facility (such as a retail store) and thereby have the theoretical ability to read an RFID tag regardless of where that tag might be located within the facility. By one approach, one or more overhead RFID-tag readers may hang suspended from the ceiling of the facility. Examples in such regards can be found, for example, in U.S. patent application Ser. No. 12/900,191, entitled METHOD AND APPARATUS PERTAINING TO RFID TAG READER ANTENNA ARRAY, the contents of which are fully incorporated herein by this reference.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item correlated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.) Generally speaking, such highly individualized RFID tags are viewed and used as a means to permit the tracking of unique corresponding items such as individual commodities offered for sale to the public.

BRIEF DESCRIPTION OF THE DRAWINGS

The above needs are at least partially met through provision of the method and apparatus pertaining to RFID tag-based user assertions described in the following detailed description, particularly when studied in conjunction with the drawings, wherein:

FIG. 3 comprises a top plan view as configured in accordance with various embodiments of the invention;

FIG. 4 comprises a top plan view as configured in accordance with various embodiments of the invention;

FIG. 5 comprises a top plan view as configured in accordance with various embodiments of the invention.

Figure 1:
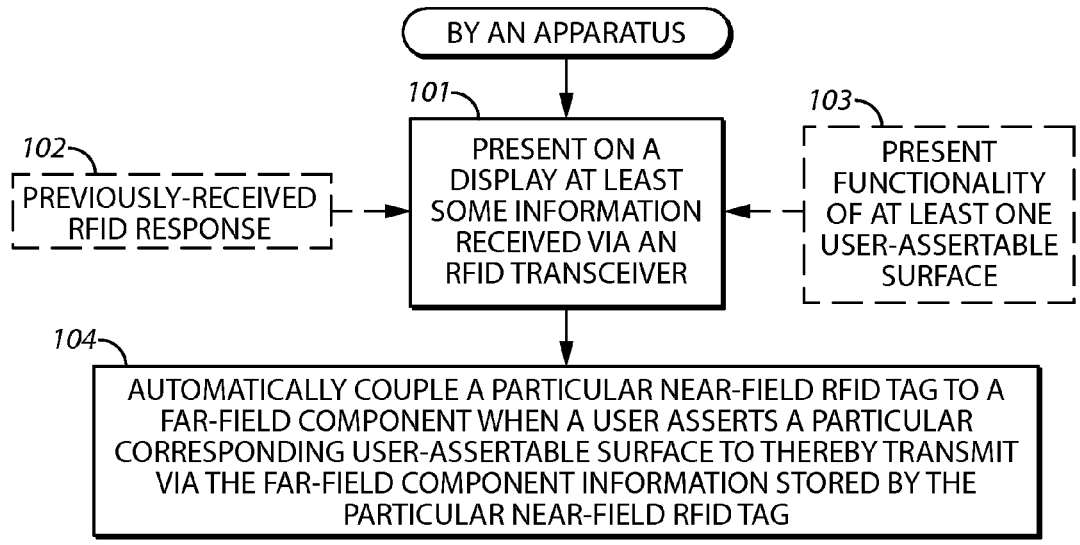
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these teachings an apparatus can include a display and one or more user-assertable surfaces. When asserted by a user, such a surface selectively physically/operably couples a corresponding near-field RFID tag to a far-field component such that information stored by the near-field RFID tag is transmitted via the far-field component. The display, in turn, presents at least some information that the apparatus receives via an RFID transceiver. Depending upon the design this RFID transceiver can be the same as the aforementioned near-field RFID tag or can comprise a different RFID tag (such as but not limited to a far-field RFID tag).

By one approach the aforementioned user-assertable surfaces comprise discrete push buttons. When the far-field component comprises a far-field antenna, asserting such a push button serves to place the corresponding near-field RFID tag into operable proximity of the far-field antenna. This operable proximity can comprise, for example, inductive coupling between these components and/or physical, electrical contact sufficient to permit the near-field RFID tag to receive energy and to communicate via the far-field antenna.

By one approach the apparatus can include a plurality of such user-assertable surfaces and a corresponding plurality of near-field RFID tags. The communicative functionality/purpose of each such user-assertable surface can be fixed or can vary dynamically as desired. This functionality/purpose can vary as desired to suit the needs of a given application setting. By one approach, for example, given ones of the user-assertable surfaces can correlate to specific display navigation commands. By another approach, in lieu of the foregoing or in combination therewith, one or more of the user-assertable surfaces can correlate to specific selection commands that pertain to user-selectable options presented on the display.

So configured, such an apparatus can have the form factor and appearance of a tablet/pad-styled computer or e-reader style of device and can display information and accommodate user interactions with that displayed information while nevertheless lacking much in the way of ordinary supporting hardware and software. By employing relatively inexpensive RFID tags and leveraging an already-available RFID-reader system such an apparatus can provide useful two-way data communications capabilities at an extremely-low price point. Furthermore, such a system can leverage an already-installed RFID-reader infrastructure without little or no incremental increase in the capital or operating costs of that infrastructure.

Accordingly, it then becomes economically feasible to provide, for example, every associate in even a large retail facility with such an apparatus. Such a communicative paradigm, in turn, can be leveraged in a great variety of ways to improve productivity, efficiency, compliance, user satisfaction, and a real-time or near-real-time view of operations. These teachings can also be leveraged, if desired, by providing customers with such an apparatus to facilitate and support a wide variety of services while shopping at the facility.

Figure 2:
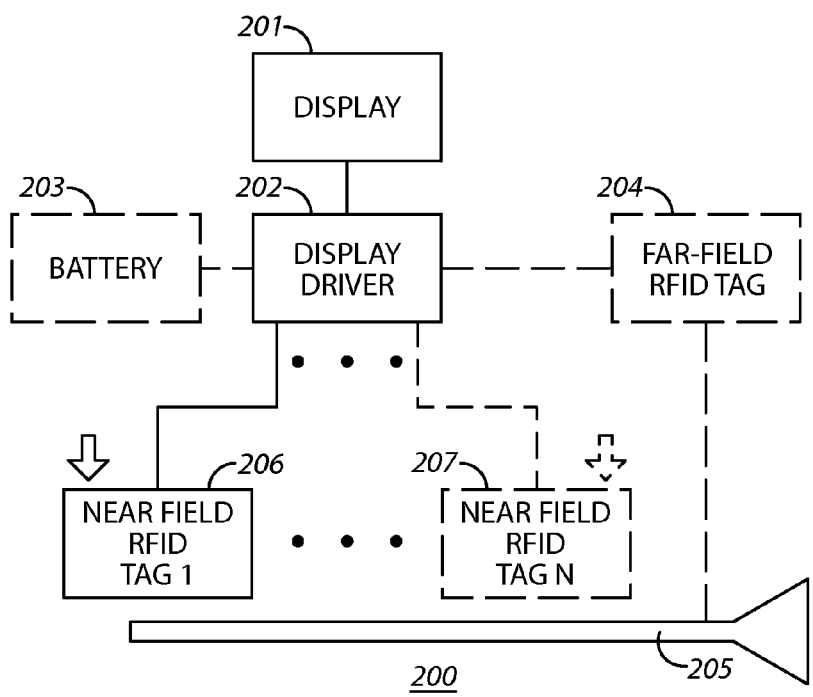
FIG. 2 comprises a block diagram as configured in accordance with various embodiments of the invention.

FIG. 1 presents a process 100 that comports with many of these teachings. It will be presumed for the sake of this description that an appropriate apparatus carries out this process 100. FIG. 2 presents an illustrative example of such an apparatus 200. It will be understood that no particular limitations are intended regarding such an apparatus by way of the specificity of this example.

The illustrated apparatus 200 includes a display 201. Numerous technologies can serve in these regards. By one approach the display 201 comprises an electronic paper display (such as, but not limited to, an electrophoretic ink display as is known in the art). Electronic paper embodiments offer the advantage of very low power consumption performance. A display driver 202 operably couples to the display 201 and serves as an interface by which information can be compatibly provided to the display 201 for presentation thereon. Both displays and their corresponding display drivers are well known in the art and require no further elaboration here.

For some application settings the apparatus 200 may operate in a satisfactory manner using only power harvested from RFID-tag reader emissions. If desired, however, the apparatus 200 can also optionally include a portable power supply such as a battery 203. Also if desired, the apparatus 200 can include a recharging circuit (not shown) that serves to recharge such a battery 203 (using, for example, externally-provided electric power and/or harvested RFID-tag reader emissions).

In this illustrative example the apparatus 200 includes an optional far-field RFID tag 204 that couples to a far-field antenna 205. Being "far-field," this RFID tag 204 can communicate in ordinary course with RFID-tag readers that are located many meters away (such as ten meters away, fifteen meters away, and so forth). (Those skilled in the art will recall that RFID-tag readers typically comprise legally-regulated transmitters that must observe relatively low power-transmission levels.)

In this illustrative example it will also be presumed that this far-field RFID tag 204 is an EPC tag and hence has a unique identifying code. So configured, for example, the apparatus 200 can receive information via the far-field RFID tag 204 that can be provided to the display driver 202 and then presented on the display 201. By one approach that information can be specifically targeted to this particular apparatus 200 (and hence to a particular user to whom the apparatus 200 is assigned) by use of the unique identifier that comprises a part of the EPC.

The apparatus 200 also includes at least one near-field RFID tag (represented here by near-field RFID tag 1 through near-field RFID tag N as denoted by reference numerals 206 and 207). Being "near-field," these tags 206, 207 are only intrinsically capable of a very limited range of wireless communication (typically less than one meter and more likely only a few centimeters such as less than ten centimeters). It will again be presumed here for the sake of example that each of these near-field RFID tags 206, 207 comprises an EPC tag and hence each such tag has a uniquely-assigned identifier.

Each of these particular near-field RFID tags 206, 207 is associated with a corresponding user-assertable surface. As will be described below in more detail, those user-assertable surfaces can each comprise, by one approach, a discrete push button. When asserted by a user (using, for example, a finger or thumb) a given such user-assertable surface selectively couples the corresponding near-field RFID tag 206, 207 to a far-field component that comprises, in this example, the aforementioned far-field antenna 205. So configured, that near-field RFID tag will then serve as a far-field component notwithstanding the near-field design of the tag itself (The interested reader will find further details regarding ways to operably associate a near-field RFID tag with a far-field antenna in U.S. Pat. No. 8,286,884, entitled UNIVERSAL RFID TAGS AND MANUFACTURING METHODS as issued on Oct. 16, 2012 and in U.S. Pat. No. 8,286,887, entitled RFID TAGS SENSORS AND METHODS as issued on Oct. 16, 2012. The entire contents of both of these patents are hereby incorporated herein by this reference.)

There are various ways by which such an approach can be accommodated. For example, the described push buttons can be physically biased away from the far-field component and can be physically connected to a given near-field RFID tag. Such biasing can be accomplished using any of a variety of spring mechanisms including springs of various shapes, sizes, and materials. For example, by one simple approach a compressible, fully-resilient dome can serve in these regards by placing the near-field RFID tag on the interior of the dome at the apex thereof and by placing the user-assertable surface on the exterior of the dome at the apex thereof.

By pushing on the push button the near-field RFID tag is physically moved towards (and even into contact with) the far-field component. Upon removing user pressure from the push button the push button (and hence the corresponding near-field RFID tag) then returns to the unasserted position.

When coupled as described above, a given near-field RFID tag 206, 207 can then communicate with a more distantly-located RFID reader. This communication can include transmitting, for example, information stored in the near-field RFID tag 206, 207. By one approach, this information can be as limited and as simple as the unique EPC identifier for the transmitting near-field RFID tag 206, 207.

FIG. 3 presents a further illustrative example in these regards. In this example the apparatus 200 has the form factor of a relatively thin e-reader or other small tablet/pad-styled computer that includes the aforementioned display 201. In this example the apparatus 200 received (via, for example, the aforementioned far-field RFID tag 204 acting as the intervening RFID transceiver) information comprising the text "ARE YOU ON BREAK?" The apparatus 200 presents that received text 301 on the display 201.

In this example the apparatus 200 includes five of the aforementioned user-assertable surfaces 302. The five push buttons that serve in these regards as configured in the general shape of a plus sign. To facilitate appropriate selection and use of these user-assertable surfaces 302 the display 201 presents information 303 regarding present functionality of at least one (and in this case, two) of the user-assertable surfaces 302. In this specific illustrative example, this information 303 indicates that the left-most user-assertable surface 302 represents a "yes" response to the displayed text 301 while the right-most user-assertable surface 302 represents a "no" response.

In this particular example, then, the user selects either the right-most or the left-most user-assertable surface 302 as corresponds to their answer. Upon asserting the selected user-assertable surface 302 the corresponding near-field RFID tag 206, 207 is then operably coupled to the aforementioned far-field antenna 205. So coupled, the asserted near-field RFID tag 206, 207 communicates with an RFID-tag reader and conveys, for example, its unique identifier. The RFID-tag reader and/or another control circuit that communicatively couples to the RFID-tag reader can then use that unique identifier to determine which user-selectable surface 302 the user asserted. That selection, mapped to the aforementioned assigned response functionality, permits the system to determine whether the user responded with a "yes" or a "no."

These teachings will accommodate assigning static and unchanging response functionality to one or more of the user-assertable surfaces 302 if desired. As described, however, the functionality can vary dynamically as desired to accommodate a particular user-interaction paradigm.

These teachings will also accommodate a variety of user interactions. FIGS. 4 and 5 provide an illustrative example in these regards. In this example the display 201 presents a list 401 of items. In this list 401 as initially shown in FIG. 4 item 2 is presently highlighted 402 (for example, by use of background shading) to indicate that this item is presently selectable (by, for example, asserting the central user-assertable surface).

The user-assertable surfaces 302 in this example have statically-assigned functionality. The peripheral user-assertable surfaces each correspond to a display navigation command while the centrally-disposed user-assertable surface comprises a selection command pertaining to a user-selectable option presented on the display 201. In particular, the topmost user-assertable surface corresponds to SCROLL-UP command, the bottom-most user-assertable surface corresponds to a SCROLL-DOWN command, the left-most user-assertable surface corresponds to a SCROLL-LEFT command, and the right-most user-assertable surface corresponds to a SCROLL-RIGHT command.

By asserting, for example, the bottom-most user-assertable surface, the corresponding near-field RFID tag 206, 207 is communicatively coupled to the far-field antenna 205 and the unique identifier for that particular near-field RFID tag 206, 207 communicated to the RFID-tag reader. The RFID tag-reader system then correlates that unique identifier to the corresponding assigned functionality to determine that the user has indicated a SCROLL-DOWN command.

In this example the RFID tag-reader responsively transmits updated information to the apparatus 200. Per this updated information the display 201 of the apparatus 200 now presents the selection highlighting 501 in conjunction with ITEM 3. In effect, then, the selection highlighting appears to scroll downwardly from ITEM 2 to ITEM 3 in response to the user having asserting the SCROLL-DOWN user-assertable surface.

Accordingly, and referring again to FIG. 1, such an apparatus 200 can, at 101, present on its display 201 at least some information the apparatus 200 received via an RFID transceiver. This information can optionally include, for example, part or all of one or more previously-received RFID responses 102 and/or present functionality 103 of at least one user-assertable surface as desired. At 104 the apparatus 200 can then automatically couple a particular near-field RFID tag 206, 207 to a far-field component (such as, but not limited to, the aforementioned far-field antenna 205) when a user asserts a particular corresponding user-assertable surface 302 to thereby effect the transmission (via the far-field component) of information stored by the particular near-field RFID tag (such as, but not limited to, the EPC unique identifier for that near-field RFID tag). That transmitted information, in turn, can serve to identify specific navigation commands, selections, and/or responses of the user.

Accordingly, such an apparatus 200 can effectively mimic the behavior of a far more expensive and capable device using, for the most part, only a number of very inexpensive RFID tags and related components. Flexibility is easily accommodated, at least in part, by how many user-assertable surfaces are offered in a given platform and/or by assigning the specific functionality of a given user-assertable surface on an as-needed basis.

It would of course be possible to configure one or more of the near-field RFID tags 206, 207 to transmit specific button-functionality content (such as, for example, corresponding text such as "yes," "no," "soon," "uncertain," and so forth). For many application settings, however, and presuming adequate capability on the part of the RFID tag-reader system to map specific EPC identifiers to specific corresponding responses/functions, it will suffice to use essentially generic, ready-to-use RFID tags.

In some cases it may be useful or even necessary for the user to maintain assertion of a given user-assertable surface for some period of time in order to ensure that the necessary communications are completed. By one approach, if desired, a signal 403 can be provided on the display 201 as shown in FIG. 4 to indicate that a sufficient period of time has passed and/or, for example, that an acknowledgement signal has been received from the RFID-tag reader. An audible signal can also serve in these same regards if desired.

These teachings are highly flexible in practice. It would be possible, for example, to configure the user-assertable surfaces to physically move, for example, a far-field antenna into operably contact with a non-moving near-field RFID tag rather than vice versa as described. As another example, these teachings would accommodate moving each near-field RFID tag into operating proximity of a separate, discrete far-field antenna rather into operating proximity of a far-field component that is shared with other tags/user-assertable surfaces.

Figure 6:
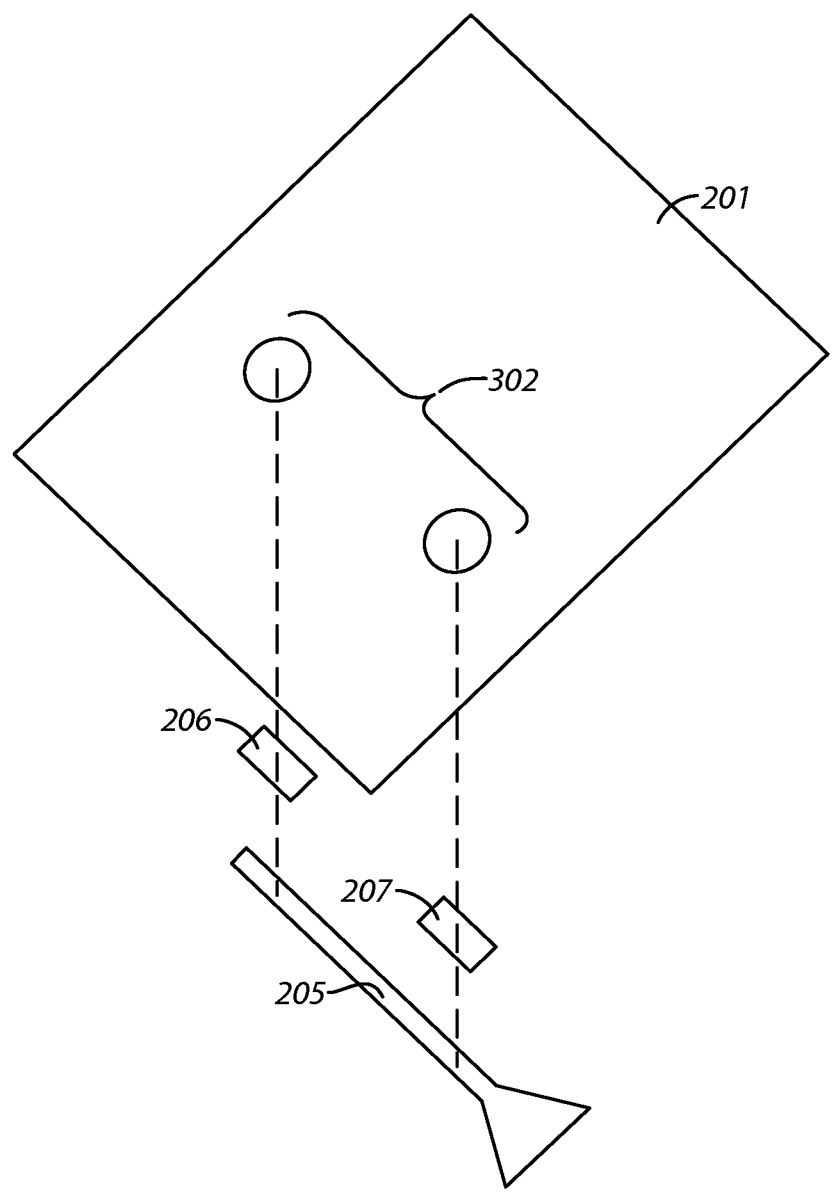
FIG. 6 comprises a perspective exploded schematic view in accordance with various embodiments of the invention.

As another example in these regards, and referring now to FIG. 6, by one approach the user-assertable surfaces 302 can comprise corresponding portions of the display 201 itself (in application settings where the display 201 can be slightly deflected by finger pressure without causing damage to the display 201). In such a case, corresponding near-field RFID tags 206 and 207 can be disposed beneath and in vertical registration with those user-assertable surfaces 302 such that pressing one of the user-assertable surfaces 302 will cause the corresponding near-field RFID tag to again be moved into operable proximity with a far-field antenna 205 that in turn underlies those near-field RFID tags 206 and 207. In such a case the display 201 can present an appropriate indicator (such as an image of a button) to visually indicate that local functionality of the display 201.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

We claim:

1. An apparatus comprising:
   a display;
   a radio-frequency identification (RFID) transceiver that operably couples to the display such that the display will present at least some information received via the RFID transceiver;
   a plurality of user-assertable surfaces that each, when individually asserted by a user, selectively couples a single corresponding unique near-field RFID tag of a plurality of near-field RFID tags to a far-field component that is shared with others of the plurality of near-field RFID tags such that information stored by the corresponding unique near-field RFID tag is transmitted via the far-field component without also transmitting information for any others of the plurality of near-field RFID tags.

2. The apparatus of claim 1 wherein the display comprises an electronic paper display.

3. The apparatus of claim 1 wherein the far-field component at least comprises a far-field antenna.

4. The apparatus of claim 3 wherein the RFID transceiver operably couples to the far-field antenna.

5. The apparatus of claim 1 wherein the information presented on the display includes information regarding present functionality of at least one of the user-assertable surfaces.

6. The apparatus of claim 5 wherein the information presented on the display includes information regarding present functionality of each of the plurality of user-assertable surfaces.

7. The apparatus of claim 1 wherein at least some of the user-assertable surfaces correspond to at least one of:
   a display navigation command;
   a selection command pertaining to a user-selectable option presented on the display.

8. The apparatus of claim 1 wherein the user-assertable surfaces each comprises a discrete push button.

9. The apparatus of claim 1 wherein at least one of the user-assertable surfaces underlies the display.

10. A method comprising:
    by an apparatus:
    presenting on a display at least some information received via a radio-frequency identification (RFID) transceiver;
    automatically coupling a single particular near-field RFID tag of a plurality of near-field RFID tags to a far-field component when a user asserts a particular corresponding user-assertable surface of a plurality of user-assertable surfaces to thereby transmit via the far-field component information stored by the particular near-field RFID tag without also transmitting information for any others of the plurality of near-field RFID tags, wherein the far-field component is shared with others of the plurality of near-field RFID tags.

11. The method of claim 10 wherein presenting on the display at least some of the information received via an RFID transceiver comprises, at least in part, presenting on the display information regarding present functionality of at least one of the user-assertable surfaces.

12. The method of claim 11 wherein at least one of the user-assertable surfaces underlies the corresponding display of the information regarding the present functionality of the at least one of the user-assertable surfaces that underlies the corresponding display.

13. The method of claim 10 wherein presenting on the display at least some of the information received via an RFID transceiver comprises, at least in part, presenting on the display information that comprises a response to a prior transmission made by a combination of one of the plurality of near-field RFID tags and the far-field component.

* * * * *